(12) United States Patent
Maller et al.

(10) Patent No.: US 10,913,044 B2
(45) Date of Patent: Feb. 9, 2021

(54) DEVICE FOR GAS SOLIDS FLUIDIZED SYSTEM TO ENHANCE STRIPPING

(71) Applicant: Technip Process Technology, Inc., Houston, TX (US)

(72) Inventors: Alexander Maller, Houston, TX (US); Eusebius Anku Gbordzoe, Houston, TX (US)

(73) Assignee: Technip Process Technology, Inc., Houston, TX (US)

( * ) Notice: Subject to any disclaimer, the term of this patent is extended or adjusted under 35 U.S.C. 154(b) by 0 days.

(21) Appl. No.: 15/649,729

(22) Filed: Jul. 14, 2017

(65) Prior Publication Data
US 2019/0015808 A1   Jan. 17, 2019

(51) Int. Cl.
*B01J 8/00* (2006.01)
*B01J 8/34* (2006.01)
(Continued)

(52) U.S. Cl.
CPC ............... *B01J 8/34* (2013.01); *B01J 8/0055* (2013.01); *B01J 19/32* (2013.01); *C10G 11/182* (2013.01);
(Continued)

(58) Field of Classification Search
CPC ... B01J 8/00; B01J 8/005; B01J 8/0055; B01J 8/18; B01J 8/24; B01J 8/34; B01J 19/00;
(Continued)

(56) References Cited

U.S. PATENT DOCUMENTS

| 2,767,967 A | * | 10/1956 | Hutchinson | ............... B01D 3/18 |
| | | | | 202/158 |
| 4,356,611 A | | 11/1982 | Chen et al. | |

(Continued)

FOREIGN PATENT DOCUMENTS

| EP | 0070917 A1 | 2/1983 |
| FR | 2366859 A1 | 5/1978 |
| GB | 1402833 A | 8/1975 |

OTHER PUBLICATIONS

U.S. Appl. No. 15/827,410, filed Nov. 30, 2017, Marchant, Paul et al.
(Continued)

*Primary Examiner* — Natasha E Young
(74) *Attorney, Agent, or Firm* — Locke Lord LLP; Peter J. Fallon; Alicia J. Carroll

(57) ABSTRACT

A device for the intimate mixing of solid particles and a gaseous medium within a gas-solid fluidized bed, comprising a plurality corrugated and/or ribbed planar stanchions arranged in alternating intersecting planes that provide a plurality of open spaces between or adjacent the alternating intersecting planar stanchions. The element has a three-dimensional lattice configuration and the corrugated and/or ribbed planar stanchions are formed from metal having peaks and valleys or ribs, such that the peaks and valleys or ribs are angled at less than 90 degrees from the fall-line of the planar stanchion when assembled into the element. The angled peaks and valleys or ribs form channels that enhance lateral movement of catalyst particles into the spaces between the stanchions to provide improved vapor/solids mixing and contact.

25 Claims, 5 Drawing Sheets

(51) Int. Cl.
  *B01J 19/00* (2006.01)
  *B01J 19/32* (2006.01)
  *C10G 11/18* (2006.01)
(52) U.S. Cl.
  CPC ..... *C10G 11/187* (2013.01); *B01J 2219/3221* (2013.01); *B01J 2219/32206* (2013.01); *B01J 2219/32213* (2013.01); *B01J 2219/32248* (2013.01); *B01J 2219/32262* (2013.01); *B01J 2219/32279* (2013.01); *B01J 2219/32286* (2013.01)
(58) Field of Classification Search
  CPC ........ B01J 19/32; B01J 2219/32–32206; B01J 2219/32279; B01J 2219/32286; C10G 11/00; C10G 11/14; C10G 11/18; C10G 11/182; C10G 11/187
  See application file for complete search history.

(56) References Cited

U.S. PATENT DOCUMENTS

| | | | |
|---|---|---|---|
| 4,744,928 A | 5/1988 | Meier | |
| 5,407,607 A * | 4/1995 | Mix | B01F 5/0617 261/112.2 |
| 5,463,113 A * | 10/1995 | Yamamoto | B01D 3/009 422/211 |
| 5,470,542 A * | 11/1995 | Stringaro | B01D 3/009 422/211 |
| 5,716,585 A | 2/1998 | Senegas et al. | |
| 6,096,407 A * | 8/2000 | Vodicka | B01J 19/32 428/175 |
| 6,224,833 B1 * | 5/2001 | Rall | B01J 8/0055 422/139 |
| 6,251,499 B1 | 6/2001 | Lehman et al. | |
| 6,267,359 B1 | 7/2001 | Stippick | |
| 6,511,635 B2 * | 1/2003 | Mauleon | B01F 5/0451 208/113 |
| 7,179,427 B2 | 2/2007 | Marchant et al. | |
| 7,297,249 B2 * | 11/2007 | Kaibel | B01J 19/32 208/120.01 |
| 7,332,132 B2 | 2/2008 | Hedrick et al. | |
| 8,646,758 B2 * | 2/2014 | Raynal | B01J 19/32 261/112.2 |
| 8,936,757 B2 | 1/2015 | Gamas-Castellanos et al. | |
| 9,174,153 B2 * | 11/2015 | Llamas | B01D 45/08 |
| 9,238,210 B2 | 1/2016 | Marchant et al. | |
| 2010/0213625 A1 | 8/2010 | Raynal et al. | |

OTHER PUBLICATIONS

International Search Report and Written Opinion dated Aug. 24, 2018 issued in PCT/US2018/41906.
International Search Report and Written Opinion dated Feb. 19, 2019 issued in PCT/US2018/063115.
Demulder et al., FCC Catalyst Stripper Internals Update of Experience With Koch-Glitsch KFBE Static Mixer at Total Refinery Antwerp, presented at FCC Forum 2005.

* cited by examiner

DEVICE FOR GAS SOLIDS FLUIDIZED SYSTEM TO ENHANCE STRIPPING

FIELD OF THE INVENTION

The present disclosure relates to fluidized beds in which solids and fluids flow in a countercurrent relationship. More particularly, the embodiments disclosed herein are directed to internals and more specifically packing elements to facilitate contact between the solids and fluids in the fluidized bed.

DESCRIPTION OF THE RELATED ART

The Fluidized Catalytic Cracking (FCC) process is a chemical process commonly used in oil refineries, the purpose of which is to convert heavy, high molecular weight hydrocarbon materials into lighter lower molecular weight hydrocarbon fractions. In this type of process a hydrocarbon feedstock is vaporized at high temperatures and at the same time placed in contact with the particles of the cracking catalyst maintained in suspension in the feedstock vapor and entrained thereby. After the cracking reactions have produced the desired molecular weight range with a corresponding drop in boiling points, the products obtained are separated from the catalyst particles. The particles are subsequently stripped to recover the entrained hydrocarbons, regenerated by burning the coke formed thereon and recycled by once again being placed in contact with the feedstock to be cracked.

In this process, the desired decrease in boiling point of the hydrocarbons is brought about by controlled catalytic and thermal reactions. These reactions take place almost instantaneously when the finely atomized feedstock is brought in contact with the catalyst particles. In the short time during which the catalyst particles are in contact with the feedstock, however, the particles rapidly become deactivated essentially because of hydrocarbon adsorption and the deposition of coke and other contaminants onto the active sites of the catalyst. Thus, it is necessary to strip the deactivated catalyst continuously, for example with steam, to recover the hydrocarbons adsorbed and entrained in the voids, and regenerate the catalyst, continuously and without altering its properties, by controlled combustion of the coke in a single-stage or multistage regeneration section before recycling the catalyst particles to the reaction zone.

Stripping is one of the determining steps in the fluid catalytic cracking process. In fact, insufficient stripping results in the reactor effluent remaining on and in between the catalyst particles so that during the regeneration step an additional combustion load is imposed upon the regenerator with excessive heat production beyond the heat needed to drive the catalytic reaction. As a result, the combustion of entrained hydrocarbon vapors into the regenerator represents a loss in final yield of converted product.

In an FCC process the stripping and regeneration of the catalyst particles typically takes place in fluidized beds to promote vigorous mixing and intimate contact of fluid streams and catalyst particles within a vessel. Fluidized beds are usually generated by passing the fluid stream, typically a vapor stream, upwardly through a bed of small solid particles at a flow rate sufficient to suspend the particles and cause a turbulent mixing of the solid particles.

Generally, after reactor effluents are separated from the catalyst particles, the particles are directed to a stripping chamber where stripping takes place in a descending dense fluidized phase. A gaseous fluid injected at the bottom of the chamber is used to fluidize the coked catalyst particles and displace the entrained hydrocarbons located in the interstitial spaces between the particles. It is preferential to use a polar material, such as steam, for this gaseous fluid, as it is more strongly adsorbed by the catalyst particles and thus the hydrocarbons are more readily displaced. Finally, the stripped catalyst particles are transferred to the regeneration zone.

Moreover, the stripping operation is challenging. In particular, it is difficult to control the travel of the catalyst particles and to avoid partial de-fluidization linked with channeling (direct passage of large bubbles through the fluidized bed) and with back-mixing (downflow of poorly fluidized particles or even recirculation of such particles, especially in the region of the stripping chamber wall). Thus, the range of and average stripping time of deactivated catalyst particles and the quality of contact between grains and gaseous fluid are difficult to control particularly in fluidized beds of large volume. Additionally, when the catalyst flow rates decrease to a level much lower than the designed flow rates, higher steam to catalyst ratios are required to maintain fluidization of the catalyst in the stripper and effect sufficient stripping efficiency. The excess steam increases the gas and liquid load on equipment connected to the stripper. For example, the excess steam can increase the quantity of sour water produced per pound of hydrocarbon processed, as well as increase the operating costs for producing and processing the excess steam.

In order to overcome these problems it is necessary to utilize devices internal to the stripper chamber to facilitate effective mixing and improve the dispersion and the homogenization of the particles by the stripping fluid. In particular, after passing through the stripping device, the particles are redistributed in space which ensures a state of organized agitation with the fluid and promotes random contacts. The fluid and the particles are directed in a plurality of directions from a single flow. Moreover, the device prevents the back-mixing and channeling of the particles and the formation of solid or gaseous pockets within the stripping chamber.

The use of structured packing elements as the internal stripping device makes it possible to reduce the dimensions of the zone of contact between the solid particles and the fluid. In fact, because this contact is clearly improved, it is possible to use smaller stripping chambers compared to those of the prior art, without a loss in stripping performance even at very high catalyst fluxes through the stripping chamber.

Different structured packing elements have been proposed to improve stripping. For example, U.S. Pat. No. 6,224,833 to Rall et al., discloses a gas-solid fluidized bed formed within a contacting element having pairs of planar portions arranged in intersecting planes, wherein each planar portion being formed by one or more webs and one or more open slots adjacent each web. The webs and slots are arranged such that a web in one of the planar portions intersects a slot in the paired planar portion. The fluidized bed can be catalyst particles fluidized by a gas stream, such as in a catalyst stripper and/or regenerator in an FCC system. The commercial performance of U.S. Pat. No. 6,224,833 has shown deficiencies such as lower stage stripping efficiency, gas and steam maldistribution and higher than expected stripping steam usage to achieve desired stripping efficiency.

Another example is the corrugated packing described in U.S. Pat. No. 5,716,585 to Senegas et al. consists of corrugated sheets welded together to form multiple internal corrugated channels for the catalyst and steam to contact each other. This packing type has been shown in U.S. Pat. No. 6,224,833 to be less efficient for stripping hydrocarbons from the catalyst.

U.S. Pat. No. 6,251,499 to Lehman et al., discloses a corrugated strip for cross-corrugated packing and the strip comprises on its lower edge at least one downwardly projecting motif having a contour. The corrugated packing is useful in air distillation columns on board floating oil platforms or barges.

There is a need for an improved structured packing elements that overcomes the problems and limitations of U.S. Pat. No. 6,224,833. Further, there is a need for structured packing elements that require a reduced number of elements to achieve similar stripping levels, or elements that can increase stripping efficiency for the same number of elements as described in U.S. Pat. No. 6,224,833. Furthermore, there is a need for packing elements that require reduced quantities of steam to achieve optimal stripping efficiency.

The embodiments disclosed herein improve on U.S. Pat. No. 6,224,833 and any type of planar structured packing or packing such as described in U.S. Pat. No. 8,936,757 or U.S. Pat. No. 9,238,210 or U.S. Pat. No. 7,179,427 used for stripping in gas-solid applications. The embodiments presented herein use the basic structure of U.S. Pat. No. 6,224,833 for example and resolves the problems associated with it by providing a novel packing element design and process.

BRIEF SUMMARY OF THE INVENTION

An embodiment disclosed herein is directed to a gas-solid fluidized bed comprising a vessel having a shell and an open internal region within the shell and having at least one ripple packing element positioned within the open internal region. The ripple packing element comprises a plurality of corrugated or ribbed planar stanchions arranged in alternating intersecting planes that provide a plurality of windows or open spaces between or adjacent the alternating intersecting planar stanchions forming a three-dimensional lattice configuration. The planar stanchions of the ripple packing element may incorporate holes located at strategic points to aid in gas or/and catalyst flow between the planar stanchions. The gas-solid fluidized bed further comprises solid particles within the fluidized bed area and at least one gas stream flowing counter-currently to the solid particles causing fluidization of the solid particles within the ripple packing elements and the fluidized bed.

According to another embodiment the corrugated planar stanchions comprise peaks and valleys, wherein the peaks and valleys are angled at less than 90 degrees from the fall-line of the corrugated planar stanchion when assembled to form a ripple packing element. The dimensions of peaks and valleys can vary as needed for any particular process or apparatus, however, the height of the peaks usually range from about ¹⁄₁₆ of an inch to about 2 inches, but are typically about ¼ of an inch high. The depth of the valleys usually ranges from about ¹⁄₁₆ of an inch to about 2 inches, but are typically about ¼ of an inch in depth. The width of the peaks and valleys is not limited and usually ranges from about ¼ of an inch to about 24 inches, but are typically about ¾ of an inch and form channels that effectively funnel solid particles into open areas within the ripple packing element.

According to yet another embodiment the ribbed planar stanchions comprise ribs on the top surface and/or bottom surface and/or side surface of the flat planar stanchions. The ribs form channels angled at less than 90 degrees from the fall-line of the ribbed planar stanchion when assembled to form a ripple packing element. The dimensions of the ribs can vary as needed for any particular process or apparatus, and usually have a height of about ¹⁄₁₆ of an inch to about 2 inches, but are typically about ¼ of an inch in height. Further, the ribs are not limited in shape, which may include for example, square, rectangular, circular, or curved surfaces that form channels between the ribs on the surface of the stanchions. The distance between the ribs can vary as needed and are usually spaced anywhere from about ¼ of an inch to about 24 inches apart. Typically the ribs are spaced about ¾ of an inch from each other, or at distances that efficiently and effectively form channels that funnel solid particles into open areas within the ripple packing element.

According to another embodiment the holes in the corrugated and/or ribbed planar stanchions are drilled in strategic locations to aid cross mixing of solids and stripping fluid. The holes are at least about ¼ of an inch or greater in diameter and can be circular, oblong or other shapes.

According to another embodiment the height of the ripple packing element can vary from about 1 inch to about 36 inches, or lager and preferably from about 6 to about 24 inches.

According to another embodiment the planar stanchions are inclined at less than 90 degrees.

According to another embodiment the channels formed by the corrugated and/or ribbed planar stanchions are not inclined in the same direction on the stanchions.

According to another embodiment the channels formed by the corrugated and/or ribbed planar stanchions on adjacent stanchions are not pointing in the same direction.

BRIEF DESCRIPTION OF THE DRAWINGS

FIG. 5A is a schematic view of an embodiment of the ripple packing element's pattern of channels on the corrugated or ribbed planar stanchions.

FIG. 5B is a schematic view of an embodiment of the ripple packing element's pattern of channels on the corrugated or ribbed planar stanchions.

FIG. 5C is a schematic view of an embodiment of the ripple packing element's pattern of channels on the corrugated or ribbed planar stanchions.

DETAILED DESCRIPTION OF THE INVENTION

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the embodiments to those skilled in the art. Like numbers refer to like, but not necessarily the same or identical, elements throughout.

Figure 1:
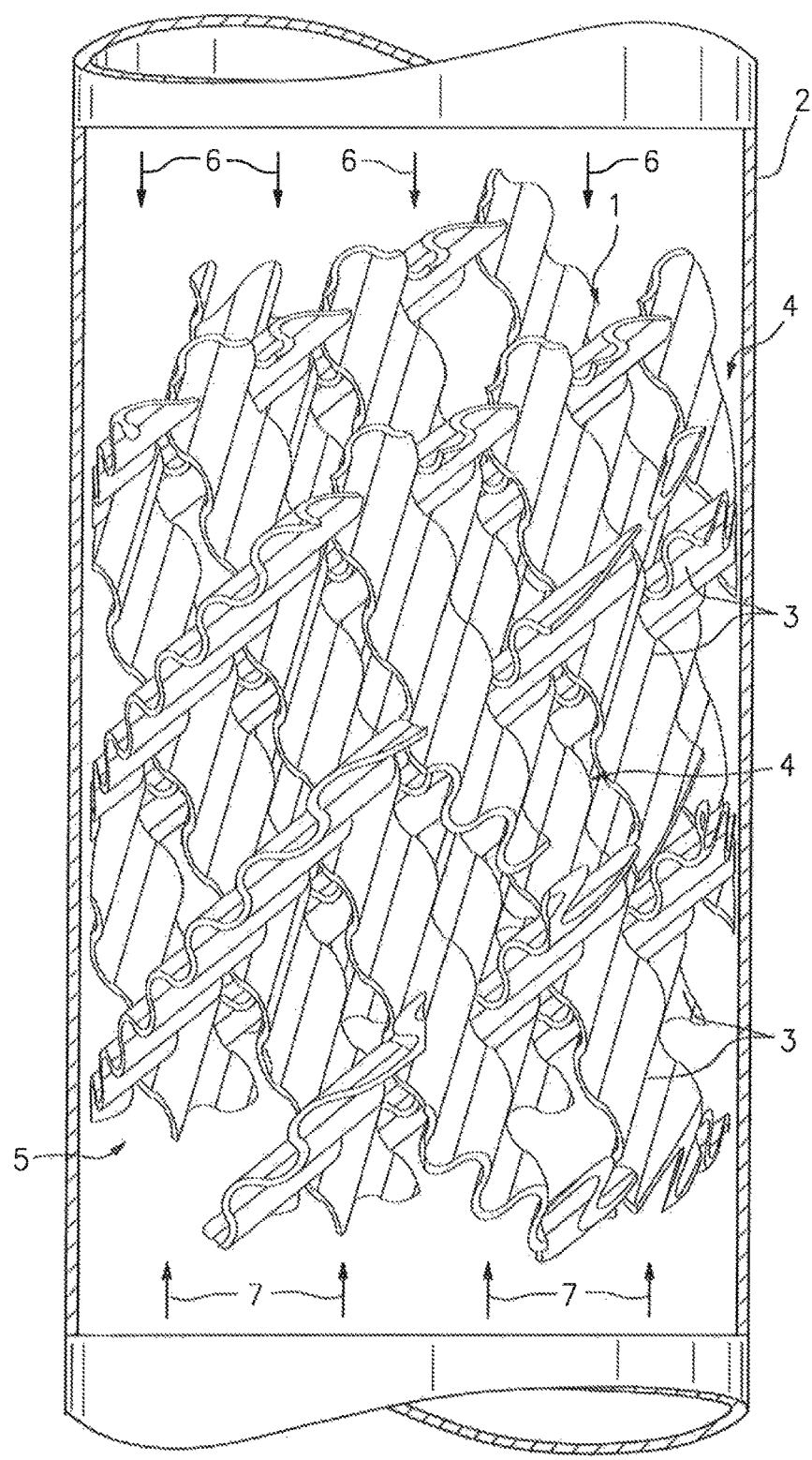
FIG. 1 is a schematic view of a column showing a fluidized bed containing an embodiment of the ripple packing element disclosed herein.

FIG. 1 presents an embodiment of the ripple packing element within the gas-solid fluidized bed (5) disclosed herein. The ripple packing element (1) is shown positioned within a cylindrical vessel (2). The cylindrical vessel (2) can be also be, for example, square or rectangular and is constructed of materials suitable for use in a fluid catalytic cracking (FCC) unit. The cylindrical vessel (2) may be used for various types of fluidized bed processing of gases and solids, such as processes involving heat exchange, mass transfer, and/or chemical reaction. For example, the cylindrical vessel (2) can be used to strip hydrocarbons from spent catalyst or to regenerate spent catalyst by burning coke from the spent catalyst in FCC processes. Additionally, the cylindrical vessel (2) can be used to effect heat exchange between gases and hot catalyst in FCC, or as flow straightener for catalyst flow or catalyst homogenization device to condition catalyst entering a FCC standpipe or as de-entraining device in fluidized beds as well as in other processes.

As presented in FIG. 1, the ripple packing element (1) comprises a plurality of corrugated and/or ribbed planar stanchions (3) (ribbed planar stanchions not shown) extending at an acute angle of less than 90 degrees across all, or a portion of, the cross section of the cylindrical vessel (2). The plurality of corrugated planar stanchions (3) extend in alternating intersecting planes and are joined together by conventional means either at one end or at an intermediate portion along their lengths. The width and thickness of the corrugated (and/or ribbed) planar stanchions (3) are not limited and determined from mechanical considerations with typical values of, for example, 3" and 5/32", respectively. The size of the windows (4), i.e., open spaces or slots that are formed between the planar stanchions (3) depends on the height of the packing element. The windows (4) allow the throughflow of gas and solids. Additionally, the corrugated planar stanchions (3) themselves may be perforated to allow fluid and gas to flow through them. In essence, the corrugated planar stanchions (3) arranged in alternating intersecting planes provide a three-dimensional lattice configuration having substantially square or diamond-shaped open spaces, i.e., windows (4) in between each of the corrugated planar stanchions (3). As such, the angle formed by the alternating intersecting corrugated planar stanchions (3) is typically 60 or 90 degrees, but can be other angles if desired.

Figure 2:
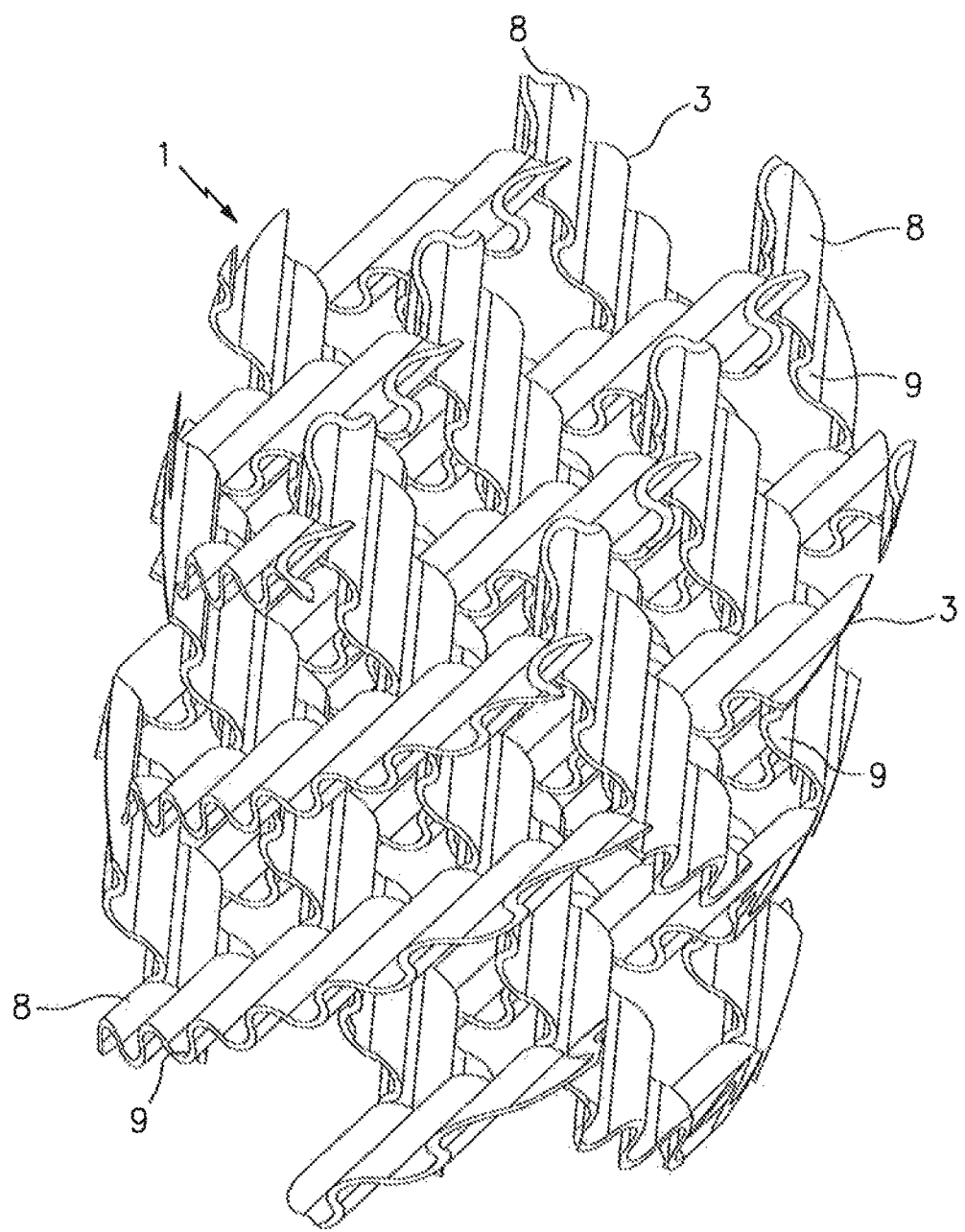
FIG. 2 is a schematic view of an embodiment of the ripple packing element disclosed herein.
Figure 3:
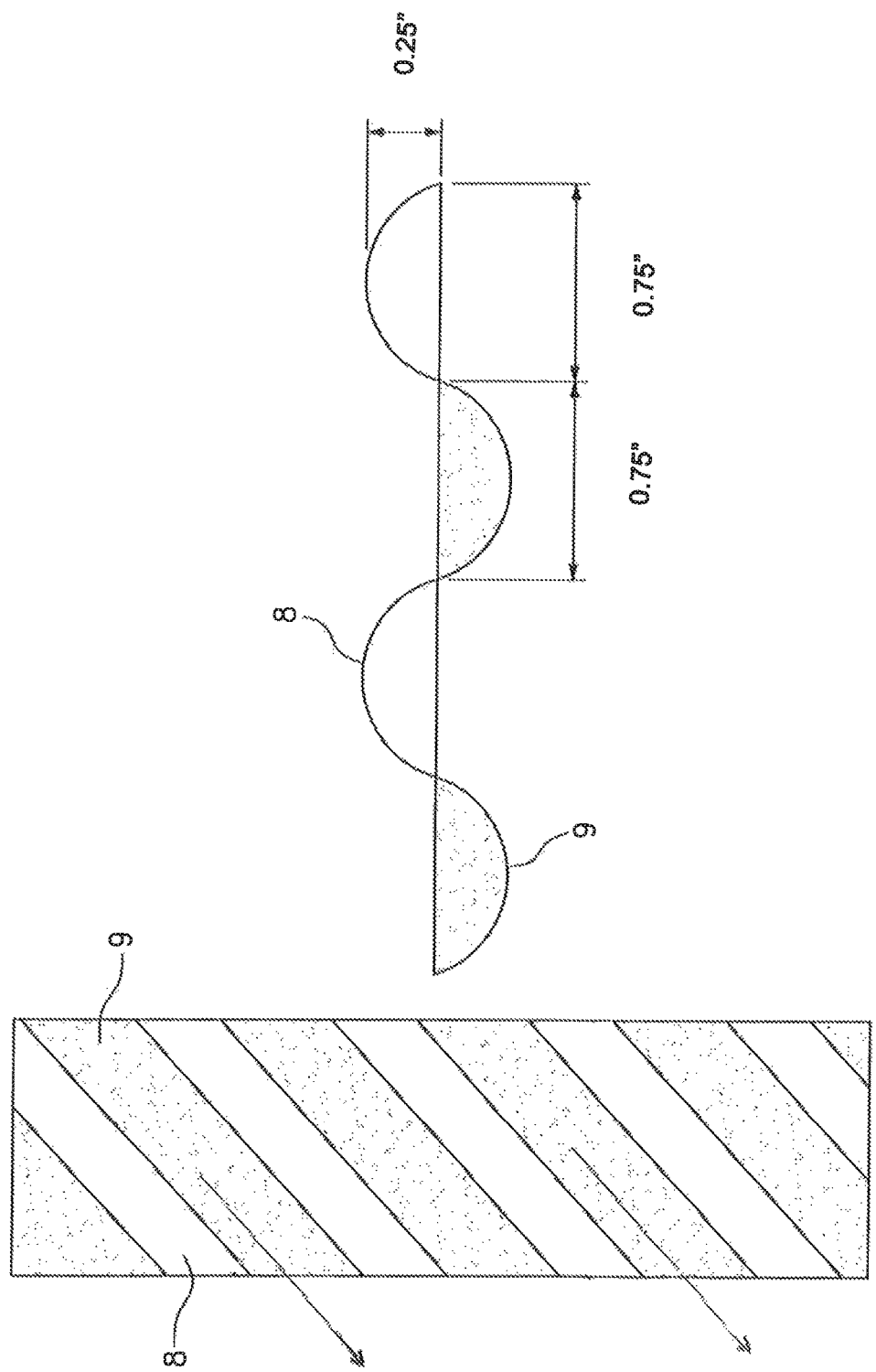
FIG. 3 is a schematic top and side view of an embodiment of the ripple packing element's dimensions and arrangement of a single corrugated planar stanchion.

FIG. 2 presents an embodiment of the ripple packing element (1), as well as, details of the corrugated planar stanchions (3) that are made of non-flat or wavy metal and look similar to the wavy metal process trays sold under the trademark RIPPLE TRAY as described in U.S. Pat. No. 2,767,967. FIG. 3 presents corrugations, i.e., waves or ridges and grooves that form channels and are comprised of peaks (8) and valleys (9) that ripple through corrugated planar stanchions (3). The peaks and valleys form channels that are angled at less than 90 degrees and, typically at about 45 degrees from the fall-line of the corrugated planar stanchion (3) when assembled into the ripple packing element (1). This arrangement is different from the corrugated sheets described in U.S. Pat. No. 5,716,585. Although the distance across each valley and the depth and height of each valley (9) and peak (8) is not limited, the actual angles and depths of the peaks and valleys that form the channels are optimized for improved stripping efficiency. According to the embodiment and as presented in FIG. 3, the angle of the peaks (8) and valleys (9) that form the channels is about 45 degrees from the fall-line of the corrugated planar stanchion (3) and distance across each valley (9) is typically about ¾ of an inch, but could range from about ¼ of an inch to about 24 inches, and the peaks and valleys are typically about ¼ of an inch in height/depth, but could range from about 1/16 of an inch and about 2 inches, respectively.

As such, the wavy metal of the corrugated planar stanchions (3) and the ribs of the ribbed planar stanchions (not shown) promote radial mixing and that increases solid particle contact with the fluidizing gaseous medium. In contrast, flat surfaced stanchions, i.e., stanchions that are not corrugated or ribbed as described herein, promote segregation of catalyst particles from the gas and the particles move down the top flat surface of the stanchion and away from the open space windows (4), where the catalyst would mix with the fluidizing gas (7). Specifically, because the waves, i.e., peaks and valleys that form the channels of the corrugated planar stanchions (3) and the ribs that form channels on the flat planar stanchions are angled to enhance lateral movement of the catalyst particles into the open space windows (4) there is better solid particle and vapor mixing and contact. Consequently, the multi directional movement of catalyst particles on the corrugated and/or ribbed planar stanchions results in better contact between catalyst and fluidized gas (7) within the ripple packing element (1), as opposed to catalyst stratification on the packing the packing element of the prior art. Thus, the ripple packing element (1) provides for increased stripping efficiency for a given quantity of stripping steam and stripping stages.

The ripple packing element (1) provides for increased number of stripping stages for a single element due to the internal reflux within the ripple packing element (1). Thus, the ripple packing element (1) provides for a reduced number of packing elements required to achieve similar stripping levels compared with the prior art packing elements, or the ripple packing element (1) provides increased stripping efficiency for the same number of elements, or alternatively the ripple packing element (1) provides reduced steam required to achieve optimal stripping efficiency.

The ripple packing element (1) can be fabricated utilizing materials and technology already well established, such as those used to produce the trademark RIPPLE TRAY and the trademark KFBE structured packing and/or other stripper packing elements.

In a non-limiting fashion, FIGS. 5A, 5B, 5C, and 5D represent some of the many patterns that are formed by the angled ribs and waves of the planar stanchions, respectively.

Figure 4:
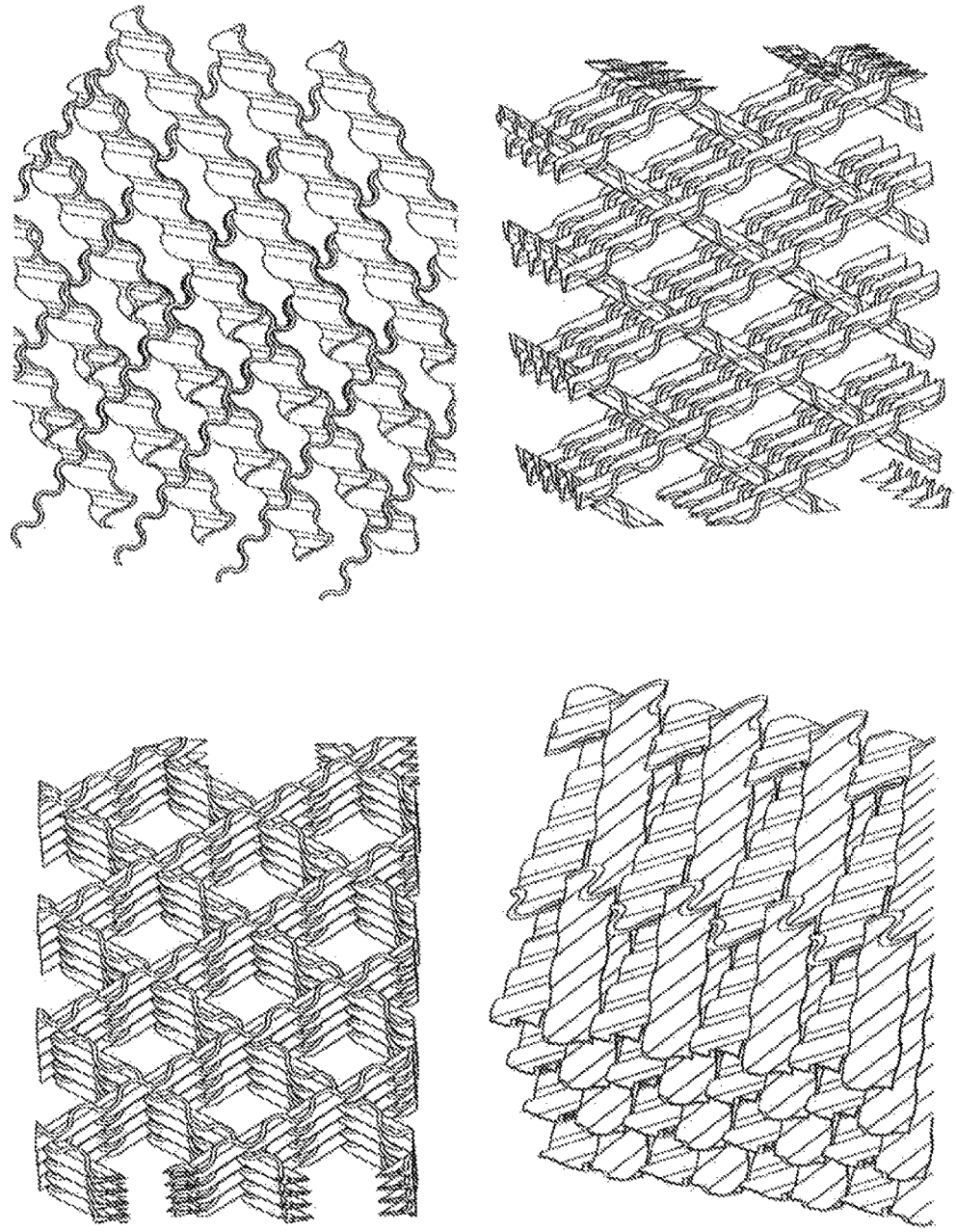
FIG. 4 is a schematic view of the ripple packing element from various angles.
Figure 5D:
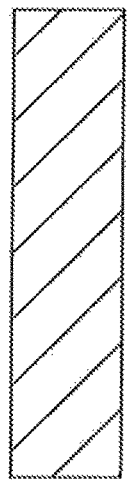
FIG. 5D is a schematic view of an embodiment of the ripple packing element's pattern of channels on the corrugated or ribbed planar stanchions.
Figure 5D:
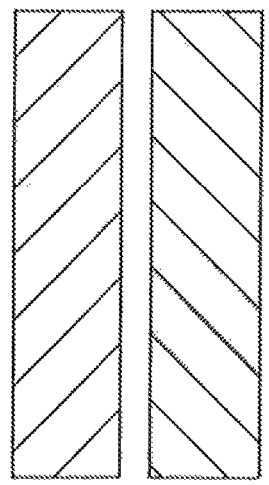
Figure 5D:
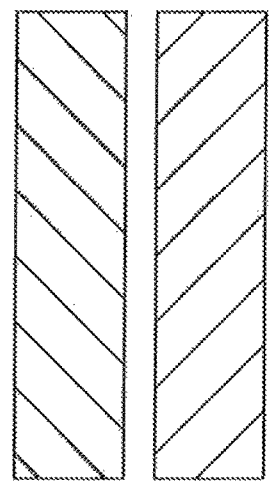
Figure 5D:
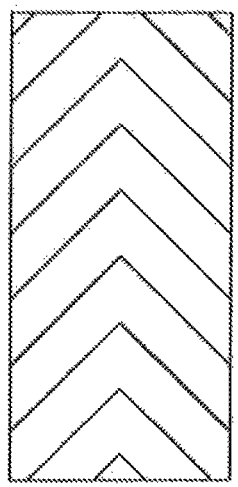

A plurality of corrugated and/or ribbed planar stanchions (3) are joined together in an aligned, interconnected and intersecting fashion to form ripple packing element (1). FIG. 4 presents views of the ripple packing element (1) from different angles. A number of ripple packing elements (1) can be placed end to end in spaced apart or contacting relationship within the cylindrical vessel (2). The adjacent packing elements (1) can be placed in alignment or they may be rotated at an angle, such as 45 degrees, 90 degrees or another desired angle, from each other. The angle formed by the plane of the each corrugated planar stanchion (3) and a longitudinal axis of the cylindrical vessel (2) varies depending upon the intersecting angle selected for the corrugated planar stanchions. For example, when a 90 degree intersecting angle is used, the corrugated planar stanchions (3) extend at an angles of 45 and 135 degrees to the vessel axis.

When a 60 degree intersecting angle is selected, the corrugated planar stanchions (3) extend at 60 and 120 degrees to the column axis.

The ripple packing element (1) may each be sized to completely fill the cross section of the cylindrical vessel (2) or a number of smaller ripple packing elements (1) may be positioned in side by side relationship or on top of each other to fill the vessel's cross section, or a portion of the vessel's cross section, e.g., ripple packing elements (1) may be spaced around perimeter of the vessel's cross section leaving the center of the cross section open. When positioned in side by side relationship, the ripple packing elements (1) may be oriented in the same or different directions and may be positioned within a plurality of rows offset from each other.

According to an embodiment a gas-solid fluidized bed (5) is formed in the portion of cylindrical vessel (2) in which the ripple packing element (1), or a plurality of ripple packing elements (1), are placed. In FIG. 1 a gas-solid fluidized bed (5) is formed by particulate solids, represented by arrows (6), and an upwardly flowing gaseous fluid, represented by arrows (7). The solids (6) are of preselected particle shape, size and composition and the gas (7) is of preselected composition and velocity. Preferably, the solids (6) will be added to the top and removed from the bottom of the gas-solid fluidized bed (5) in a continuous manner so the solids (6) and gas (7) travel counter currently through the fluidized bed. Alternately, the solids (6) remain in the fluidized bed (5) until processing has been completed and are then drained from the fluidized bed.

The gas (7), after traveling upwardly through the fluidized bed (5), enters a dilute phase above the gas-solid fluidized bed (5) and can be passed through a separator such as a cyclone (not shown) to remove any entrained solid particles before it is conveyed to a final or intermediate destination. The solids (6), after removal from the fluidized bed (5), can also be conveyed to a final or intermediate destination.

The ripple packing element (1) can be positioned at the desired vertical location within the fluidized bed (5). In some applications, it may be desirable to position the ripple packing element (1), or a plurality of ripple packing elements (1), near the upper and lower boundaries of the fluidized bed (5), while in other applications it may be desirable to position the elements (1) a preselected distance from the boundaries. In still further applications, the elements (1) may extend above or even below the fluidized bed (5).

The type of processing that occurs within the fluidized bed (5) can include heat transfer, mass transfer, combustion and/or chemical reaction. For example, the fluidized bed (5) can be used to strip hydrocarbons from spent catalyst or burn coke deposits on spent catalyst in FCC systems. For example, an FCC system (not shown) employing the ripple packing element (1), in which volatile hydrocarbons are stripped from spent, solid catalyst particles in a stripper chamber before the catalyst particles are conveyed to a regenerator where coke deposits are burned to regenerate the catalyst particles. The reactor section chamber has a riser which feeds catalyst particles and reactor effluent into an open region of the reactor chamber, where catalyst particles are separated from the reactor effluent. The catalyst particles then flow downwardly under the influence of gravity into and through the ripple packing elements (1). Steam or another stripping gas is fed through flow line to the stripper chamber at a location below the ripple packing element (1) and flows upwardly to cause fluidization of the catalyst particles within the ripple elements (1) and resulting stripping of the volatile hydrocarbons associated with the catalyst particles. Because the catalyst particles are well fluidized with the gas stream, a higher degree of processing efficiency can be achieved in comparison to convention stripping processes.

The overhead gas stream containing the stripped volatile hydrocarbons can be routed from the stripper to the FCC reactor (not shown) or another desired location through flow line. The stripped catalyst particles are transferred by another flow line from the stripper to regenerator where the coke on and within the catalyst is combusted to effectively restore the activity of the catalyst particles. The catalyst particles can then be returned to the FCC reactor (not shown). The regenerator overhead flue gas is routed to a scrubber (not shown) or is otherwise processed. Cyclonic separators (not shown) are utilized in both the regenerator and the FCC reactor to remove entrained catalyst particles from the overhead gas streams.

The results described hereinabove reflect the advantages of the stripping device according to the embodiments described herein. In particular, the improved contact between gaseous fluid and catalyst particles within the ripple packing element (1) results in reduced hydrocarbon entrainment to the regenerator and lower required regenerator combustion load and quantity of volatile hydrocarbon components, that when carried into the regenerator preferentially combust in the dilute space resulting in high temperatures which could have a negative impact of the mechanical integrity of the regenerator components.

It is to be understood that the embodiments disclosed herein defined by the appended claims is not to be limited by particular details set forth in the above description as many apparent variations thereof are possible.

What is claimed is:

1. A gas-solid fluidized bed comprising:
    a vessel having a shell and an open internal region within the shell;
    at least one ripple packing element positioned within the open internal region and comprising a plurality of corrugated and/or ribbed planar stanchions arranged in alternating intersecting planes that provide a plurality of open spaces between or adjacent the alternating intersecting planar stanchions, the ripple packing element having a three-dimensional lattice configuration, wherein the corrugated and/or ribbed planar stanchions comprise peaks and valleys, wherein the peaks and valleys are angled at less than 90 degrees from a fall line of said planar stanchion when assembled into the rippple packing element within the shell;
    solid particles within the ripple packing element; and
    at least one gas stream flowing counter-currently to the solid particles through the ripple packing element and causing fluidization of the solid particles within the ripple packing element to form the gas-solid fluidized bed.

2. The gas-solid fluidized bed of claim 1, wherein the corrugated planar stanchions comprise peaks and valleys arranged longitudinally or laterally or a combination of both.

3. The gas-solid fluidized bed of claim 1, wherein the ripple packing element comprises corrugated planar stanchions.

4. The gas-solid fluidized bed of claim 1, wherein the ripple packing element comprises ribbed planar stanchions.

5. The gas-solid fluidized bed of claim 1, wherein the ribs of the ribbed planar stanchions are angled at less than 90 degrees from the fall-line of the planar stanchion when assembled into the ripple packing element.

6. The gas-solid fluidized bed of claim 1, wherein the corrugated and/or ribbed planar stanchions have one or more holes.

7. The gas-solid fluidized bed of claim 1, wherein the height of the ripple packing element is from about 1 inch to about 36 inches.

8. The gas-solid fluidized bed of claim 1, wherein the height of the ripple packing element is from about 6 inches to about 24 inches.

9. The gas-solid fluidized bed of claim 2, wherein the peaks have a height of about 1/16 of an inch to about 2 inches and the valleys have a depth of about 1/16 of an inch to about 2 inches, and the width of the peaks and valleys is from about 1/4 of an inch to about 24 inches.

10. The gas-solid fluidized bed of claim 1, wherein the ribs of the ribbed planar stanchion have a height of about 1/16 of an inch to about 2 inches and the distance between the ribs is about 1/4 of an inch to about 24 inches.

11. The gas-solid fluidized bed of claim 2, wherein the peaks and valleys are angled at about 45 degrees from the fall-line of the planar stanchion when assembled into the ripple packing element.

12. The gas-solid fluidized bed of claim 2, wherein the peaks and valleys are angled in the same or different direction on the planar stanchions.

13. The gas-solid fluidized bed of claim 2, wherein the peaks and valleys of each planar stanchion is present in the same or opposing direction with respect to the peaks and valleys on adjacent stanchion(s).

14. The gas-solid fluidized bed of claim 5, wherein the ribs of each planar stanchion are present in the same or opposing direction with respect to the ribs on adjacent stanchion(s).

15. The gas-solid fluidized bed of claim 1, including gas stream flow conduits in communication with the vessel for directing the gas stream into the open internal region and through the ripple packing element and for removing the gas stream from the vessel after the gas stream has flowed through the ripple packing element.

16. The gas-solid fluidized bed of claim 15, including solid particle flow conduits in communication with the vessel for directing the solid particles to the ripple packing element and removing the solid particles from the vessel after passing through the ripple packing element.

17. The gas-solid fluidized bed of claim 16, wherein said gas flow conduits and solid particle flow conduits are arranged to provide countercurrent flow of the solid particles and the gas stream.

18. The gas-solid fluidized bed of claim 16, wherein said solid particles comprise catalyst particles.

19. A process for fluidizing solid particles within a vessel having a shell and at least one ripple packing element positioned within an open internal region within the shell, the ripple packing element comprising a plurality of corrugated and/or ribbed planar stanchions arranged in alternating intersecting planes that provide a plurality of open spaces between or adjacent the alternating intersecting corrugated planar stanchions and the ripple packing element having a three-dimensional lattice configuration, wherein the corrugated and/or ribbed planar stanchions comprise peaks and valleys, wherein the peaks and valleys are angled at less than 90 degrees from a fall line of said planar stanchion when assembled into the ripple packing element within the shell, said process comprising the steps of:
    providing a quantity of solid particles within the ripple packing element; and
    producing fluidization of the solid particles within the ripple packing element by flowing at least one gas stream through the element.

20. The process of claim 19, further comprising the step of directing the solid particles through the ripple packing element in a direction countercurrent to a flow direction of the gas stream.

21. The process of claim 20, further comprising the step of providing additional quantities of solid particles within the ripple packing element while removing at least some of the fluidized solid particles from the ripple packing element while the gas stream is flowing through the ripple packing element.

22. The process of claim 19, further comprising the step of retaining the quantity of solid particles within the ripple packing element while the gas stream is flowing through the ripple packing element.

23. The process of claim 19, wherein the solid particles are catalyst particles associated with volatile hydrocarbons, and wherein during the step of flowing the gas stream through the ripple packing element at least some of the volatile hydrocarbons are stripped from the catalyst particles by the gas stream during said fluidization.

24. The process of claim 23, wherein the gas stream comprising water vapor.

25. The process of claim 19, wherein the solid particles are catalyst particles containing coke deposits, and further comprising the step of burning the coke deposits to cause regeneration of the catalyst particles during said step of flowing said gas stream through the contacting device.

* * * * *